United States Patent
Yun et al.

(10) Patent No.: US 8,711,794 B2
(45) Date of Patent: Apr. 29, 2014

(54) SYSTEM AND METHOD FOR RECEIVING MBMS BROADCASTING SERVICE

(75) Inventors: Mi Young Yun, Daejeon (KR); Jung Mo Moon, Daejeon (KR); Sang Ho Lee, Daejeon (KR); Eun Hee Hyun, Daejeon (KR); Jai Hyung Cho, Daejeon (KR); Jee Hyeon Na, Daejeon (KR); Chul Park, Daejeon (KR); Sun Hwa Lim, Daejeon (KR); Hyun Suk Roh, Daejeon (KR); Dae Ik Kim, Daejeon (KR); Jae Ho Kim, Daejeon (KR); Yeong Jin Kim, Daejeon (KR); Dae Sik Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 104 days.

(21) Appl. No.: 13/335,858

(22) Filed: Dec. 22, 2011

(65) Prior Publication Data
US 2012/0163274 A1    Jun. 28, 2012

(30) Foreign Application Priority Data

Dec. 23, 2010  (KR) ........................ 10-2010-0134094

(51) Int. Cl.
*H04W 4/00*    (2009.01)
(52) U.S. Cl.
USPC ............ 370/329; 370/341; 370/322; 370/348
(58) Field of Classification Search
USPC .................. 370/322, 338, 348, 437, 329, 341
See application file for complete search history.

(56) References Cited

U.S. PATENT DOCUMENTS

| | | | | |
|---|---|---|---|---|
| 8,014,371 | B1* | 9/2011 | Miller et al. | 370/338 |
| 8,023,530 | B1* | 9/2011 | Giallorenzi et al. | 370/469 |
| 2002/0025818 | A1* | 2/2002 | Kang et al. | 455/450 |
| 2002/0159518 | A1* | 10/2002 | Bottreau et al. | 375/240.1 |
| 2005/0096017 | A1* | 5/2005 | Kim | 455/414.1 |
| 2005/0255836 | A1* | 11/2005 | Lee et al. | 455/414.1 |
| 2008/0192675 | A1 | 8/2008 | Kim et al. | |
| 2010/0231809 | A1* | 9/2010 | Suzuki | 348/731 |
| 2011/0188436 | A1* | 8/2011 | Damnjanovic et al. | 370/312 |
| 2012/0033041 | A1* | 2/2012 | Nagaraj et al. | 348/43 |
| 2012/0176953 | A1* | 7/2012 | Chao et al. | 370/312 |

\* cited by examiner

*Primary Examiner* — Ricky Ngo
*Assistant Examiner* — Kabir Jahangir
(74) *Attorney, Agent, or Firm* — Nelson Mullins Riley & Scarborough LLP; Anthony A. Laurentano, Esq.

(57) ABSTRACT

Disclosed are a system and a method for receiving an MBMS broadcasting service. In the present invention, in a mobile communication/wireless communication system, an MBMS service is provided by synchronizing a unicast bearer with a multicast bearer through scheduling information mapping at the time of transmitting a broadcast/multicast service through a unicast. Further, the present invention presents even a method for improving quality of experience (QoE) of the service by providing the MBMS service through the multicast bearer and the unicast bearer simultaneously. According to the present invention, MBMS services of various service qualities can be provided depending on wireless quality of a terminal or the capability of the terminal at the time of providing the MBMS service.

18 Claims, 6 Drawing Sheets

SYSTEM AND METHOD FOR RECEIVING MBMS BROADCASTING SERVICE

CROSS-REFERENCE TO RELATED APPLICATIONS

This application claims priority to and the benefit of Korean Patent Application No. 10-2010-0134094 filed in the Korean Intellectual Property Office on Dec. 23, 2010, the entire contents of which are incorporated herein by reference.

TECHNICAL FIELD

The present invention relates to a system and a method for receiving a multimedia broadcast multicast service (MBMS) broadcasting service. More particularly, the present invention relates to a system and a method for receiving an MBMS broadcasting service through a unicast bearer.

BACKGROUND ART

A discussion for providing a packet service and a multimedia service through a multimedia broadcast multicast service (MBMS) as well as a voice service in a mobile communication system in the related art is being conducted. The MBMS as a service that transmits one multimedia datum to multiple users by using one wireless channel through a wireless network is a method capable of saving wireless resources as compared with one-to-one transmission at the time of providing a service such as a broadcast.

The MBMS service transmission method includes a single cell transmission method and a multiple cell transmission method. In the single cell transmission method as a method in which the service is provided in only a cell receiving the MBMS service, scheduling for data is made in an eNodeB. In the multiple cell transmission method, MBMS data are synchronized and transmitted in all cells in a corresponding service area and a terminal combines MBMS transmission from multiple cells, and synchronized data scheduling is made in a multi-cell/multicast coordination entity (MCE). In this case, as a transmission carrier, a multicast/broadcast service exclusive carrier or a mixed carrier which can be transmitted together with a unicast is used.

Meanwhile, in recent years, various service qualities can be provided depending on processing capabilities of the terminals in providing the broadcasting service due to a communication environment in which base stations and terminals using a multi-carrier frequency increase with the demands for an increase in a wireless bandwidth and the emergence of terminals having various abilities.

The MBMS transmission method will be described with reference to scalable video coding (SVC) which is a method of encoding and decoding an existing H.264/MPEG-4 AVC as a function added to the H.264/MPEG-4 AVC standardized in the ITU-T and joint video team (JVT) of the ISO/IEC JTC1 into a layered stream, as an example of a technology that can provide a differentiated service depending on application requirements including a processing capability and a display capability of a target device, various network transmission states, and the like.

The MBMS transmission method as one-to-multi-point transmission is designed to save the wireless resources and receive data even in an idle state to achieve even a power saving effect of the terminal. However, since data should be transmitted in a low modulation and coding scheme (MCS) for receiving data anywhere within the diameter of a cell regardless of a wireless receiving capability of each terminal, it is difficult to provide various service qualities depending on the processing capability, wireless quality, and display capability of the terminal due to limits in a service transmission rate and the number of provided services.

SUMMARY OF THE INVENTION

The present invention has been made in an effort to provide a system and a method for receiving an MBMS broadcasting service that receive the MBMS broadcasting service through a unicast bearer by using the same synchronization information as a multicast bearer depending on a wireless quality or capability of a terminal.

An exemplary embodiment of the present invention provides a system for receiving an MBMS broadcasting service, including: a broadcasting service selecting unit selecting a MBMS broadcasting service from MBMS broadcasting services included in a received MBMS broadcasting service list; a service transmission type determining unit determining a service transmission type of the selected MBMS broadcasting service; a transmission channel setting unit, when a first bearer is set as the multicast bearer and a second bearer is set as the unicast bearer, setting a transmission channel through the first bearer in the case where the selected MBMS broadcasting service is transmitted through the first bearer and setting the transmission channel through the second bearer in the case where the selected broadcasting service is not transmitted through the first bearer, and setting the transmission channel through the first bearer with respect to some broadcasting services and the transmission channel through the second bearer with respect to the rest of the broadcasting services in the case where the selected broadcasting service is transmitted through both the first bearer and the second bearer; and a broadcasting service receiving unit receiving the MBMS broadcasting service selected according to the set transmission channel.

The broadcasting service selecting unit may receive the MBMS broadcasting service list from a broadcast multicast service center (BM-SC), and the transmission channel setting unit may set the transmission channel with respect to a second section when a section between a BM-SC and a base station is set as a first section and a section between the base station and a first terminal that intends to receive the MBMS broadcasting service is set as the second section.

The system for receiving an MBMS broadcasting service may further include a channel set-up controlling unit, when a second terminal receiving the same MBMS broadcasting service from the base station is provided, controlling the set-up of the transmission channel for the first section by using a bearer through the second terminal and when the second terminal receiving the same MBMS broadcasting service from the base station is not provided, controlling the set-up of the transmission channel for the first section by using the first bearer.

Traffic in the first section may include synchronization information of a packet, and the transmission channel setting unit may set the transmission channel for the second section through the second bearer by using a second bearer mapping method based on synchronization information of a packet when the selected MBMS broadcasting service is not transmitted through the first bearer. When at least two terminals intend to receive the same MBMS broadcasting service, the base station may perform the second bearer mapping method for each terminal. The base station may include a scheduler performing scheduling by using the synchronization information of the packet and the QoS information of the bearer, and the base station may transmit the MBMS broadcasting service to each terminal to satisfy both the synchronization information of the packet and the QoS information of the bearer considering wireless channel states of the terminals by using the scheduler.

When the selected broadcasting service is transmitted through both the first bearer and the second bearer, the transmission channel setting unit may set the transmission channel through the first bearer with respect to a base layer of an image for the MBMS broadcasting service and the transmission channel through the second bearer with respect to an enhancement layer of the image. The broadcasting service receiving unit, which is provided in a terminal receiving the MBMS broadcasting service, may selectively receive the enhancement layer of the image transmitted through the second bearer according to the image processing capability of the terminal.

The service transmission type determining unit may use a wireless channel used to transmit the service through any one selected from the multicast and the unicast at the time of determining the service transmission type or a traffic channel for transmitting traffic through any one selected from the multicast and the unicast.

The transmission channel setting unit may further consider a broadcast bearer as the first bearer at the time of setting the transmission channel.

Another exemplary embodiment of the present invention provides a method for receiving an MBMS broadcasting service, including: selecting a MBMS broadcasting service from MBMS broadcasting services included in a received MBMS broadcasting service list; determining a service transmission type of the selected MBMS broadcasting service; when a first bearer is set as the multicast bearer and a second bearer is set as the unicast bearer, setting a transmission channel through the first bearer in the case where the selected MBMS broadcasting service is transmitted through the first bearer and setting the transmission channel through the second bearer in the case where the selected broadcasting service is not transmitted through the first bearer and setting the transmission channel with respect to some broadcasting services through the first bearer and the transmission channel with respect to the rest of the broadcasting services through the second bearer in the case where the selected broadcasting service is transmitted through both the first bearer and the second bearer; and receiving the MBMS broadcasting service selected according to the set transmission channel.

In the selecting of the broadcasting service, the MBMS broadcasting service list may be received from a broadcast multicast service center (BM-SC), and in the setting of the transmission channel, the transmission channel may be set with respect to a second section when a section between a BM-SC and a base station is set as a first section and a section between the base station and a first terminal that intends to receive the MBMS broadcasting service is set as the second section.

The method for receiving an MBMS broadcasting service may further include, when a second terminal receiving the same MBMS broadcasting service from the base station is provided, controlling the set-up of the transmission channel for the first section by using a bearer through the second terminal and when the second terminal receiving the same MBMS broadcasting service from the base station is not provided, controlling the set-up of the transmission channel for the first section by using the first bearer.

Traffic in the first section may include synchronization information of a packet, and in the setting of the transmission channel, the transmission channel may be set through the second bearer with respect to the second section by using a second bearer mapping method based on synchronization information of a packet when the selected MBMS broadcasting service is not transmitted through the first bearer. The method for receiving an MBMS broadcasting service may further include bearer mapping in which the base station performs the second bearer mapping method for each terminal when at least two terminals intend to receive the same MBMS broadcasting service. The method for receiving an MBMS broadcasting service may further include transmitting the MBMS broadcasting service to each terminal to satisfy both the synchronization information of the packet and the QoS information of the bearer in consideration of the wireless channel states of the terminals by using a scheduler performing scheduling by using the synchronization information of the packet and the QoS information of the bearer, which is included in the base station.

When the selected broadcasting service is transmitted through both the first bearer and the second bearer, the transmission channel may be set through the first bearer with respect to a base layer of an image for the MBMS broadcasting service and through the second bearer with respect to an enhancement layer of the image in the setting of the transmission channel.

In the setting of the transmission channel, a broadcast bearer may further be considered as the first bearer at the time of setting the transmission channel.

According to exemplary embodiments of the present invention, the following effects can be acquired by receiving an MBMS broadcasting service through a unicast bearer by using the same synchronization information as a multicast bearer according to wireless quality of a terminal or the capability of the terminal. First, since the wireless quality of the terminal or the capability of the terminal is considered, various MBMS services and various service qualities can be provided. Second, since the MBMS service is transmitted through the unicast bearer by using the synchronization information of the MBMS, even a terminal that intends to receive the MBMS service through a unicast can smoothly receive the MBMS service and since the terminal that receives the service through the unicast bearer is a lot, contents can be easily synchronized even when the unicast bearer is switched to a multicast bearer. Third, since an improved service is transmitted through the unicast bearer according to a wireless state of each terminal by applying layered video coding such as SVC, a high-quality service can be provided to even a user who is distant from a cell diameter or a user who is positioned at an area where wireless quality is low according to the capability of a device.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

Figure 1:
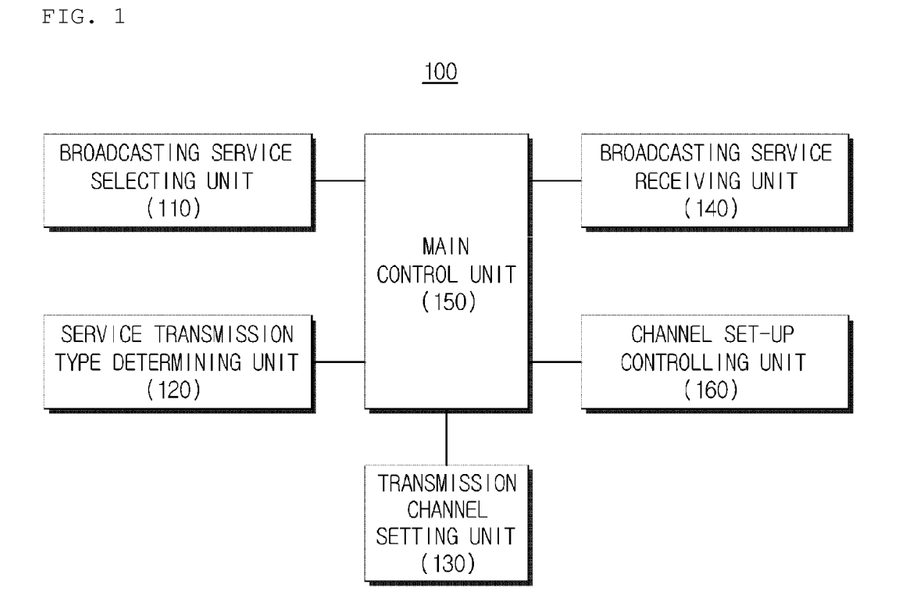
FIG. 1 is a schematic block diagram of a system for receiving an MBMS broadcasting service according to an exemplary embodiment of the present invention.

FIG. 1 is a schematic block diagram of a system for receiving a multimedia broadcast multicast service (MBMS) broadcasting service according to an exemplary embodiment of the present invention. Referring to FIG. 1, the MBMS broadcasting service receiving system 100 includes a broadcasting service selecting unit 110, a service transmission type determining unit 120, a transmission channel setting unit 130, a broadcasting service receiving unit 140, and a main control unit 150. In the exemplary embedment, the broadcasting service selecting unit 110, the service transmission type determining unit 120, the transmission channel setting unit 130, and the broadcasting service receiving unit 140 may be provided in a terminal that intends to receive an MBMS broadcasting service.

An object of the exemplary embodiment is to transmit the MBMS broadcasting service by using a unicast in a mobile wireless access system supporting a broadcast/multicast service. More particularly, the MBMS broadcasting service is transmitted through a unicast bearer by using the same synchronization information as a multicast bearer in order to provide various services and service qualities according to wireless quality or capabilities of a terminal. The MBMS broadcasting service receiving system 100 is used to achieve the above objects.

The broadcasting service selecting unit 110 serves to select a MBMS broadcasting service from MBMS broadcasting services included in a received MBMS broadcasting service list. The broadcasting service selecting unit 110 receives the MBMS broadcasting service list from a broadcast multicast service center (BM-SC).

The service transmission type determining unit 120 serves to determine a service transmission type of the selected MBMS broadcasting service. The service transmission type determining unit 120 uses a wireless channel used to transmits the service through any one selected from the multicast and the unicast at the time of determining the service transmission type, or a traffic channel for transmitting traffic through any one selected from the multicast and the unicast. In the above description, the wireless channel used to transmit the service through any one selected from the multicast and the unicast may correspond to a multicast control channel (MCCH) in the case of the multicast and a dedicated control channel (DCCH) in the case of the unicast. Further, the traffic channel for transmitting the traffic through any one selected from the multicast and the unicast may correspond to a multicast traffic channel (MTCH) in the case of the multicast and a dedicated traffic channel (DTCH) in the case of the unicast.

When a first bearer is set as the multicast bearer and a second bearer is set as the unicast bearer, the transmission channel setting unit 130 sets a transmission channel through the first bearer in the case where the selected MBMS broadcasting service is transmitted through the first bearer and sets the transmission channel through the second bearer in the case where the selected broadcasting service is not transmitted through the first bearer and sets the transmission channel through the first bearer with respect to some broadcasting services and the transmission channel through the second bearer with respect to the rest of the broadcasting services in the case where the selected broadcasting service is transmitted through both the first bearer and the second bearer.

The transmission channel setting unit 130 sets the transmission channel with respect to a second section when a section between a BM-SC and a base station is set as a first section and a section between the base station and a first terminal that intends to receive the MBMS broadcasting service is set as the second section.

The transmission channel setting unit 130 applies the same synchronization information to the first bearer and the second bearer at the time of setting the transmission channel. Based on the fact, the transmission channel setting unit 130 sets the transmission channel through the second bearer with respect to the second section by using a second bearer mapping method based on synchronization information of a packet when the selected MBMS broadcasting service is not transmitted through the first bearer. In the above description, the synchronization information of the packet is included in traffic in the first section.

When the selected broadcasting service is transmitted through both the first bearer and the second bearer, the transmission channel setting unit 130 sets the transmission channel through the first bearer with respect to a base layer of an image for the MBMS broadcasting service and through the second bearer with respect to an enhancement layer of the image.

Meanwhile, the transmission channel setting unit 130 may further consider a broadcast bearer as the first bearer at the time of setting the transmission channel.

The broadcasting service receiving unit 140 serves to receive the MBMS broadcasting service selected according to the set transmission channel. The broadcasting service receiving unit 140 may selectively receive the enhancement layer of the image transmitted through the second bearer according to the image processing capability of the terminal that intends to receive the MBMS broadcasting service.

The main control unit 150 controls an overall operation of the units constituting the MBMS broadcasting service receiving system 100.

The MBMS broadcasting service receiving system 100 may further include a channel set-up controlling unit 160 controlling the set-up of the transmission channel for the first section. When a second terminal receiving the same MBMS broadcasting service from the base station is provided, the channel set-up controlling unit 160 serves to control the set-up of the transmission channel for the first section by using a bearer through the second terminal and when the second terminal receiving the same MBMS broadcasting service from the base station is not provided, the channel set-up controlling unit 160 serves to control the set-up of the transmission channel for the first section by using the first bearer. The channel set-up controlling unit 160 may be provided in, for example, an MCE.

When at least two terminals intend to receive the same MBMS broadcasting service, the base station performs a second bearer mapping method for each terminal. At the time of considering this point, the base station transmits the MBMS broadcasting service to each terminal to satisfy both the synchronization information of the packet and the QoS information of the bearer considering wireless channel states of the terminals by using a scheduler. The scheduler, which is included in the base station, performs scheduling by using the synchronization information of the packet and the QoS information of the bearer.

Next, the case where the exemplary embodiment is actually implemented will be described as an exemplary embodiment. In the exemplary embodiment, as one example of the mobile wireless access system, a long term evolution (LTE) system which is a next-generation mobile communication system discussed in a $3^{rd}$ generation partnership project (3GPP) at present is referred and as one example of the broadcasting service, an MBMS of the 3GPP is referred. In the exemplary embodiment, each of the base station and the terminal may use one carrier and may perform transmission and reception by using multiple carriers. The MBMS service is transmitted through an MBMS-exclusive carrier or a mixed carrier.

Figure 2:
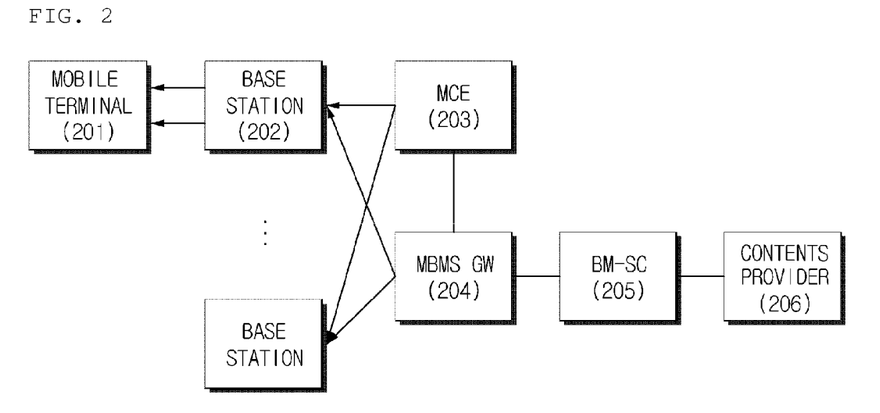
FIG. 2 is a structural diagram of a mobile communication network for a broadcast/multicast single frequency network (MBSFN) for providing a broadcasting service on a mobile communication network according to the exemplary embodiment.

FIG. 2 is a structural diagram of a mobile communication network for a broadcast/multicast single frequency network (MBSFN) for providing a broadcasting service on a mobile communication network according to the exemplary embodiment. A mobile terminal 201 receiving the broadcasting service, a base station 202 providing a point-to-multipoint service, an MCE 203 allocating the same scheduling information to multiple base stations, an MBMS-GW 204 transmitting MBSFN traffic to the base station, an MME taking charge of transferring signal messages of the MCE 203 and the MBMS-GW 204, a BM-SC 205 transmitting broadcasting data including MBMS session control and a SYNC protocol, and a content provider 206 providing broadcasting contents. Parameters associated with service quality of a session among messages transmitted to an eNB from the MCE 203 include allocation and retention priority (ARP) and GBR QoS information. The ARP is constituted by pre-emption capability and pre-emption vulnerability associated with priority level and pre-emption representing the priority of the session or not. The GBR QoS information is constituted by an MBMS E-RAB maximum bit rate downlink representing the maximum bit rate and an MBMS E-RAB guaranteed bit rate downlink representing the minimum guaranteed bit rate.

Figure 3:
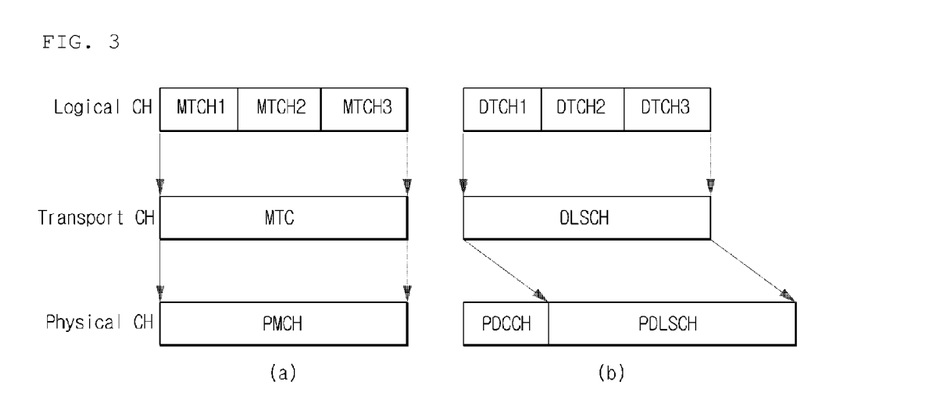
FIG. 3 is a conceptual diagram showing a multicast transmission channel and a unicast transmission channel.

FIG. 3 is a conceptual diagram showing a multicast transmission channel and a unicast transmission channel. Wireless channels used for transmission through the multicast include a multicast control channel (MCCH) and a multicast traffic channel (MTCH). In FIG. 3(*a*), only the MTCH is described for convenience. Multiple MTCHs may be provided and the MCCH and the MTCH are mapped to an MCH transport channel according to synchronized scheduling information.

The MCCH information as an RRC control message associated with the MTCH is periodically transmitted according to a change cycle and a repetition cycle. The MCCH information is changed depending on the generation, change, and removal of the MBMS service.

In order for the terminal to receive the MBMS service by using the point-to-multipoint wireless bearer, the terminal receives wireless bearer setting information mapped to service information through the MCCH channel information and sets the corresponding information therein.

The terminal receives the MBMS service through an MCH according to previously received scheduling information from.

Wireless channels used for transmission through the unicast include a DCCH for setting the wireless bearer and a DTCH transmitting unicast traffic. In FIG. 3(*b*), only the DTCH is described for convenience. In order to receive the unicast traffic, the wireless bearer is set through the DCCH and the terminal senses data by monitoring a PDCCH.

Figure 4:
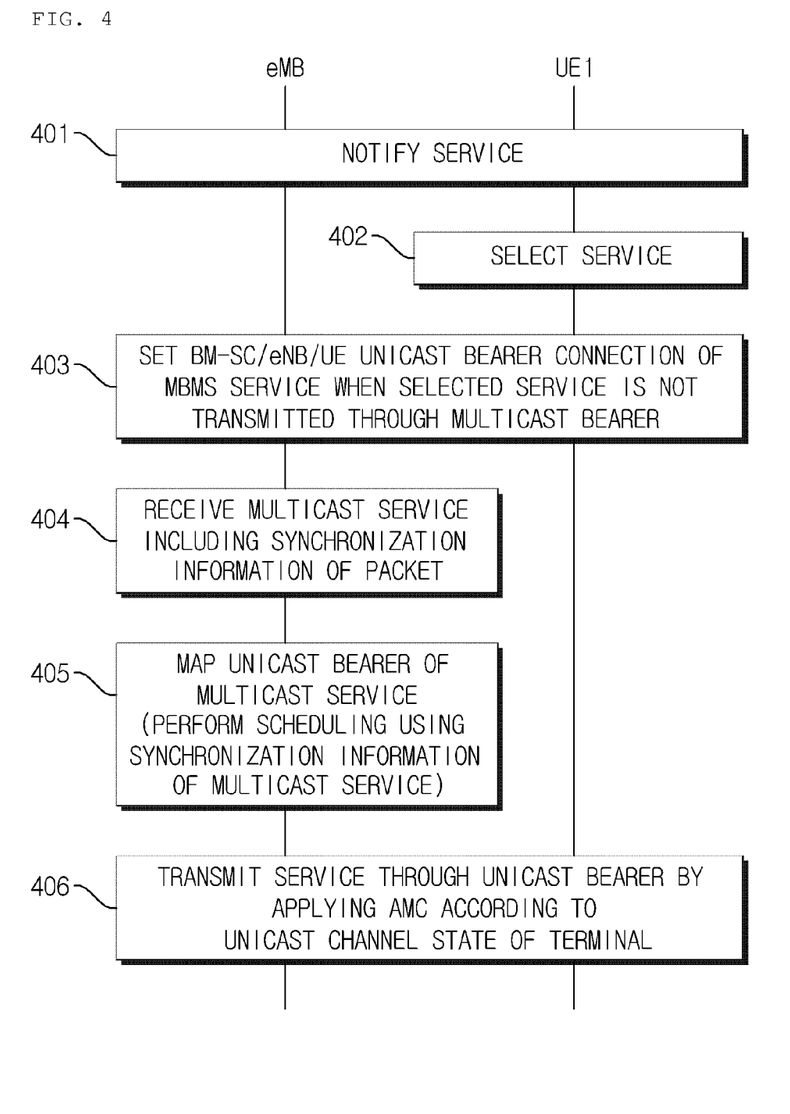
FIG. 4 is a conceptual diagram illustrating an exemplary embodiment of a base station and a terminal when a multicast service is transmitted through only a unicast bearer.

FIG. 4 is a conceptual diagram illustrating an exemplary embodiment of a base station and a terminal when a multicast service is transmitted through only a unicast bearer.

The terminal receives an MBMS service notification from the BM-SC (401). A receiving terminal that receives the service notification selects a service and verifies a bearer through which the corresponding service is provided (402). As one example, it may be verified whether the corresponding multicast service is transmitted through a multicast bearer by receiving MCCH information.

When it is verified that the selected service is not transmitted through the multicast bearer, a unicast bearer connection set-up for the corresponding service is performed (403). In this case, a bearer setting procedure between the base station and the terminal is the same as the existing method. A bearer set-up between the BM-SC and the base station uses a multicast bearer when a user who has already received the service from the corresponding base station exists. On the contrary, when there is no bearer, the multicast bearer is set. In this case, traffic transferred from the BM-SC to the base station should include synchronization information (for example, Timestamp) of a packet.

The base station receives the MBMS service including the synchronization information of the packet from the BM-SC (404) and maps the received MBMS service to the set unicast bearer (405). If multiple terminals in one base station receive the same service through the unicast, the base station should map the corresponding service to the unicast bearer for each terminal. A scheduler of the base station performs scheduling by using the synchronization information (for example, Timestamp) of the packet and the QoS information of each bearer. The corresponding service is transmitted to satisfy the synchronization information and the QoS according to a wireless channel state of each terminal (406).

Figure 5:
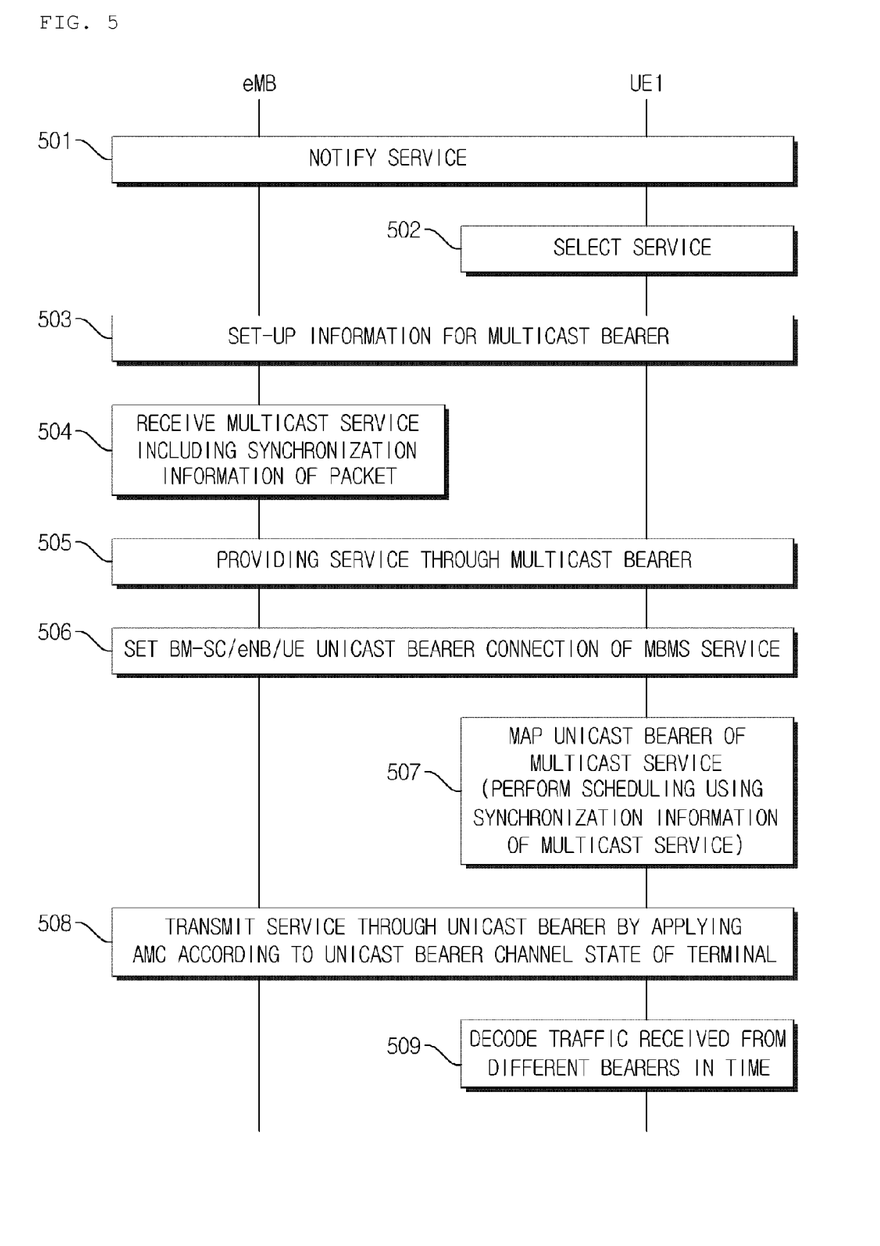
FIG. 5 is a conceptual diagram illustrating an exemplary embodiment of the base station and the terminal that can improve quality of experience (QoE) by receiving the MBMS service from the unicast bearer except for receiving the MBMS service through a multicast bearer.

FIG. 5 is a conceptual diagram describing an exemplary embodiment of the base station and the terminal that can improve quality of experience (QoE) by receiving the MBMS service through the unicast bearer except for receiving the MBMS service through a multicast bearer.

As one example of a technology that can provide a differentiated service depending on application requirements including a processing capability and a display capability of a mobile terminal, various network transmission states, and the like, scalable video coding (SVC) will be referred to.

A base layer of the SVC has basic quality of an image and an upper layer has additional coding information corresponding to high quality. Further, the base layer of the SVC tends to have a small amount of information, while the upper layer tends to have a large amount of information. For servicing an image, the base layer is basically received and the upper layer is selectively received depending on the capability of the terminal device.

The terminal receives an MBMS service notification from the BM-SC (501). The receiving terminal that receives the service notification selects a service and verifies a bearer through which the corresponding service is provided (502). For example, a service of basic quality may be provided through the multicast bearer and improved service quality may be provided through the unicast bearer. The service provided through the multicast bearer sets the multicast bearer and the service provided through the unicast bearer requires a unicast connection set-up therefor. A procedure of the service provided through the multicast bearer includes acquiring set-up information for the multicast bearer (503), receiving a multicast service including packet synchronization (504), and providing a service through the multicast bearer (505). On the contrary, when some of the selected services are transmitted through the unicast bearer, a unicast bearer connection set-up for the corresponding service is performed (506). A procedure of the service provided through the unicast bearer includes mapping the unicast bearer of the multicast service by performing the scheduling using the synchronization information of the multicast service (507) and transmitting the service through the unicast bearer by applying an AMC according to a channel state of the unicast bearer of the terminal (508). In this case, a bearer setting procedure between the base station and the terminal is the same as the existing method. A bearer set-up between the BM-SC and the base station uses a multicast bearer when a user who has already received the service from the corresponding base station, exists. On the contrary, when there is no bearer, the multicast bearer is set. In this case, traffic transferred from the BM-SC to the base station should include synchronization information (for example, Timestamp) of a packet.

If multiple terminals in one base station receive the same service through the unicast, the base station should map the corresponding service for each terminal. A scheduler of the base station performs scheduling by using the synchronization information (for example, Timestamp) of the packet and the QoS information of each bearer. The base station transmits the corresponding service to satisfy the synchronization information and the QoS according to the wireless channel state of each terminal (509).

Figure 6:
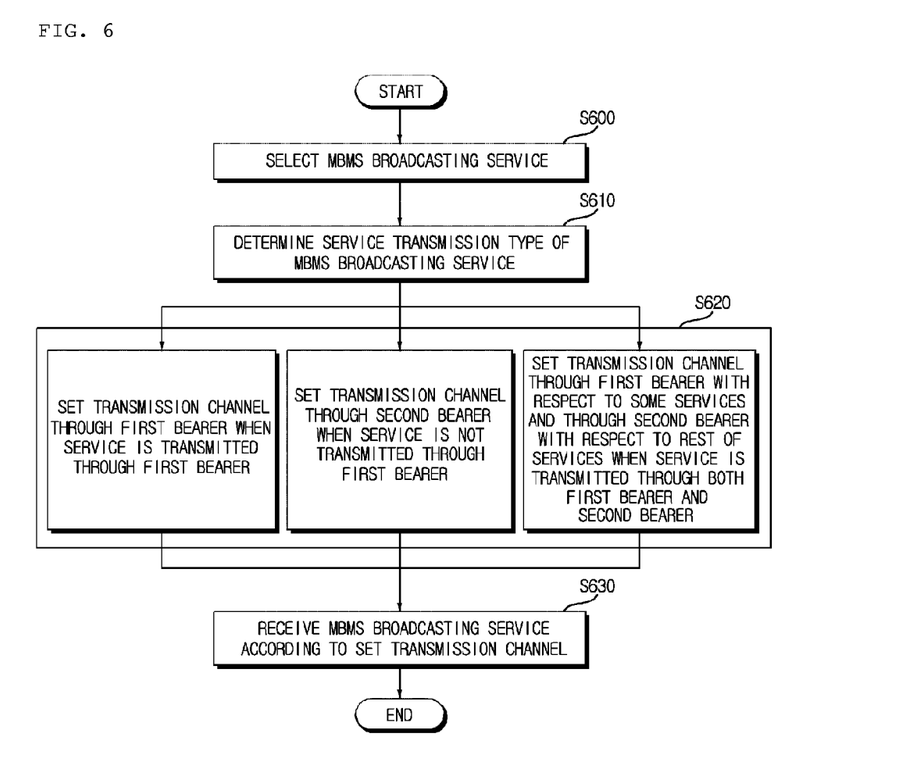
FIG. 6 is a flowchart showing a method for receiving an MBMS broadcasting service according to an exemplary embodiment of the present invention.

Next, an MBMS broadcasting service receiving method of the MBMS broadcasting service receiving system 100 will be described. FIG. 6 is a flowchart showing a method for receiving an MBMS broadcasting service according to an exemplary embodiment of the present invention. The following description refers to FIG. 6.

First, a MBMS broadcasting service is selected from MBMS broadcasting services included in a received MBMS broadcasting service list (selecting the broadcasting service, S600). In the selecting of the broadcasting service (S600), the MBMS broadcasting service list is received from a broadcast multicast service center (BM-SC).

Thereafter, a service transmission type of the selected MBMS broadcasting service is determined (determining the service transmission type, S610).

Thereafter, when a first bearer is set as the multicast bearer and a second bearer is set as the unicast bearer, a transmission channel is set through the first bearer in the case where the selected MBMS broadcasting service is transmitted through the first bearer and the transmission channel is set through the second bearer in the case where the selected broadcasting service is not transmitted through the first bearer, and the transmission channel is set through the first bearer with respect to some broadcasting services and the transmission channel is set through the second bearer with respect to the rest of the broadcasting services in the case where the selected broadcasting service is transmitted through both the first bearer and the second bearer (setting the transmission channel, S620).

In the setting of the transmission channel (S620), the transmission channel is set with respect to a second section when a section between the BM-SC and the base station is set as a first section and a section between the base station and a first terminal that intends to receive the MBMS broadcasting service is set as the second section.

In the setting of the transmission channel (S620), the transmission channel is set through the second bearer with respect to the second section by using a second bearer mapping method based on the synchronization information of the packet when the selected MBMS broadcasting service is not transmitted through the first bearer. In the above description, the synchronization information of the packet is included in traffic in the first section.

When the selected broadcasting service is transmitted through both the first bearer and the second bearer, the transmission channel is set through the first bearer with respect to a base layer of an image for the MBMS broadcasting service and through the second bearer with respect to an enhancement layer of the image, in the setting of the transmission channel (S620).

Meanwhile, in the setting of the transmission channel (S620), a broadcast bearer may be further considered as the first bearer at the time of setting the transmission channel.

Thereafter, the MBMS broadcasting service selected according to the set transmission channel is received (receiving the broadcasting service, S630).

Meanwhile, before the receiving of the broadcasting service (S630), controlling a channel set-up may be performed. In the controlling of the channel set-up, when a second terminal receiving the same MBMS broadcasting service from the base station is provided, the set-up of the transmission channel for the first section is controlled by using a bearer through the second terminal and when the second terminal receiving the same MBMS broadcasting service from the base station is not provided, the set-up of the transmission channel for the first section is controlled by using the first bearer. If the controlling of the channel set-up is performed before the receiving of the broadcasting service (S630), the controlling of the channel set-up may be performed before or after any step.

When at least two terminals intend to receive the same MBMS broadcasting service, mapping the bearer and transmitting the broadcasting service may be performed. In the mapping of the bearer, the base station performs the second bearer mapping method for each terminal. The mapping of the bearer may be performed between the determining of the service transmission type (S610) and the setting of the transmission channel (S620). In the transmitting of the broadcasting service, the MBMS broadcasting service is transmitted to each terminal to satisfy both the synchronization information of the packet and the QoS information of the bearer in consideration of the wireless channel states of the terminals by using a scheduler performing scheduling by using the synchronization information of the packet and the QoS information of the bearer, which is included in the base station. The transmitting of the broadcasting service may be performed between the setting of the transmission channel (S620) and the receiving of the broadcasting service (S630).

Figure 7:
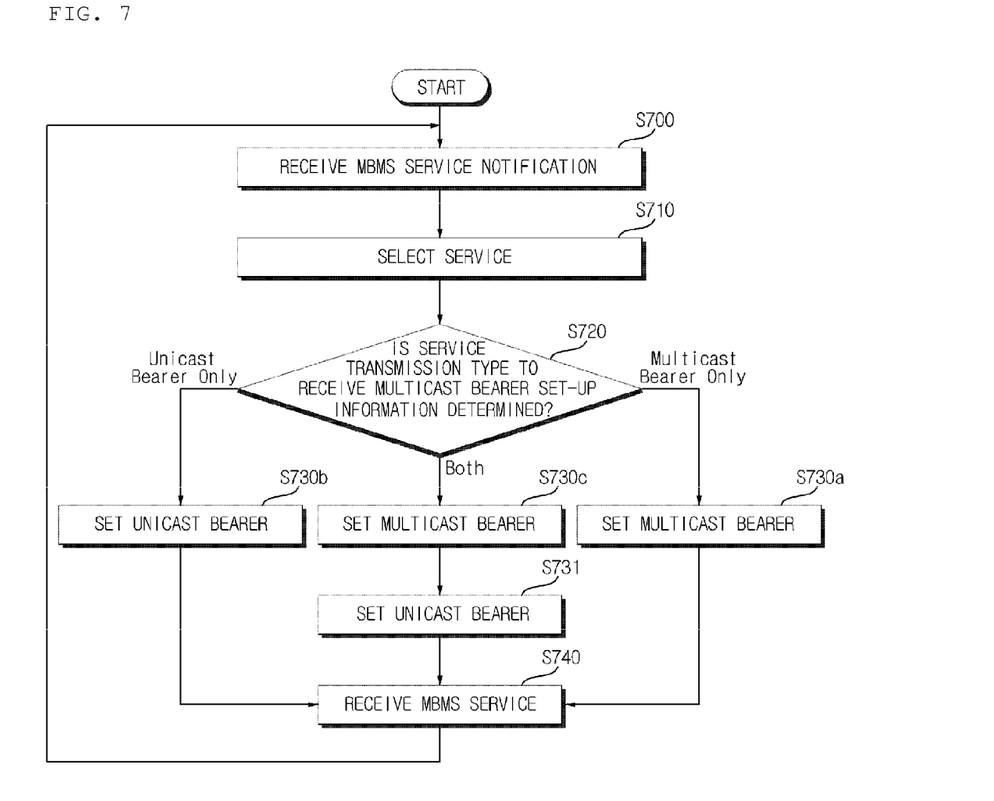
FIG. 7 is an operational flowchart of a terminal when the method according to the exemplary embodiment of the present invention is applied.

FIG. 7 is an operational flowchart of a terminal when the method according to the exemplary embodiment of the present invention is applied. The terminal that intends to receive the MBMS service receives the MBMS service notification (S700). A desired service is selected from notified services (S710). It should be judged whether the notified service is serviced through the multicast bearer (S720). In this case, as an example, it may be judged by the multicast bearer set-up information, that is, the MCCH. When the service is transmitted through only the multicast bearer, the multicast bearer is set (S730a) and the service is received (S740). When the service is transmitted through only the unicast bearer, the unicast bearer is set (S730b) and the service is received (S740). If the selected service is transmitted through the unicast and the multicast, the multicast bearer is set (S730c) and the unicast bearer is set (S731) to receive the MBMS service (S740). The traffic received through each bearer should be decoded in time according to codec information.

The present invention is applicable when an MBMS broadcasting service is provided.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A system for receiving a multimedia broadcast multicast service (MBMS) broadcasting service, comprising:
  a broadcasting service selecting unit selecting a MBMS broadcasting service from MBMS broadcasting services included in a received MBMS broadcasting service list;
  a service transmission type determining unit determining a service transmission type of the selected MBMS broadcasting service;
  a transmission channel setting unit, when a first bearer is set as the multicast bearer and a second bearer is set as the unicast bearer, setting a transmission channel through the first bearer in the case where the selected MBMS broadcasting service is transmitted through the first bearer and setting the transmission channel through the second bearer in the case where the selected broadcasting service is not transmitted through the first bearer, and setting the transmission channel through the first bearer with respect to some broadcasting services and the transmission channel through the second bearer with respect to the rest of the broadcasting services in the case where the selected broadcasting service is transmitted through both the first bearer and the second bearer; and
  a broadcasting service receiving unit receiving the MBMS broadcasting service selected according to the set transmission channel.

2. The system for receiving an MBMS broadcasting service of claim 1, wherein:
  the broadcasting service selecting unit receives the MBMS broadcasting service list from a broadcast multicast service center (BM-SC), and
  the transmission channel setting unit sets the transmission channel with respect to a second section when a section between a BM-SC and a base station is set as a first section and a section between the base station and a first terminal that intends to receive the MBMS broadcasting service is set as the second section.

3. The system for receiving an MBMS broadcasting service of claim 2, further comprising:
  a channel set-up controlling unit, when a second terminal receiving the same MBMS broadcasting service from the base station is provided, controlling the set-up of the transmission channel for the first section by using a bearer through the second terminal and when the second terminal receiving the same MBMS broadcasting service from the base station is not provided, controlling the set-up of the transmission channel for the first section by using the first bearer.

4. The system for receiving an MBMS broadcasting service of claim 2, wherein:
  traffic in the first section includes synchronization information of a packet, and
  the transmission channel setting unit sets the transmission channel for the second section through the second bearer by using the second bearer mapping method based on synchronization information of a packet when the selected MBMS broadcasting service is not transmitted through the first bearer.

5. The system for receiving an MBMS broadcasting service of claim 4, wherein when at least two terminals intend to receive the same MBMS broadcasting service, the base station performs a second bearer mapping method for each terminal.

6. The system for receiving an MBMS broadcasting service of claim 5, wherein:
  the base station includes a scheduler performing scheduling by using the synchronization information of the packet and the QoS information of the bearer, and
  the base station transmits the MBMS broadcasting service to each terminal to satisfy both the synchronization information of the packet and the QoS information of the bearer considering wireless channel states of the terminals by using the scheduler.

7. The system for receiving an MBMS broadcasting service of claim 1, wherein when the selected broadcasting service is transmitted through both the first bearer and the second bearer, the transmission channel setting unit sets the transmission channel through the first bearer with respect to a base layer of an image for the MBMS broadcasting service and the transmission channel through the second bearer with respect to an enhancement layer of the image.

8. The system for receiving an MBMS broadcasting service of claim 7, wherein the broadcasting service receiving unit, which is provided in a terminal receiving the MBMS broadcasting service, selectively receives the enhancement layer of the image transmitted through the second bearer according to the image processing capability of the terminal.

9. The system for receiving an MBMS broadcasting service of claim 1, wherein the service transmission type determining unit uses a wireless channel used to transmit the service through any one selected from the multicast and the unicast at the time of determining the service transmission type or a traffic channel for transmitting traffic through any one selected from the multicast and the unicast.

10. The system for receiving an MBMS broadcasting service of claim 1, wherein the transmission channel setting unit further considers a broadcast bearer as the first bearer at the time of setting the transmission channel.

11. A method for receiving a multimedia broadcast multicast service (MBMS) broadcasting service, comprising:
    selecting a MBMS broadcasting service from MBMS broadcasting services included in a received MBMS broadcasting service list;
    determining a service transmission type of the selected MBMS broadcasting service;
    when a first bearer is set as the multicast bearer and a second bearer is set as the unicast bearer, setting a transmission channel through the first bearer in the case where the selected MBMS broadcasting service is transmitted through the first bearer and setting the transmission channel through the second bearer in the case where the selected broadcasting service is not transmitted through the first bearer and setting the transmission channel through the first bearer with respect to some broadcasting services and the transmission channel through the second bearer with respect to the rest of the broadcasting services in the case where the selected broadcasting service is transmitted through both the first bearer and the second bearer; and
    receiving the MBMS broadcasting service selected according to the set transmission channel.

12. The method for receiving an MBMS broadcasting service of claim 11, wherein:
    in the selecting of the broadcasting service, the MBMS broadcasting service list is received from a broadcast multicast service center (BM-SC), and
    in the setting of the transmission channel, the transmission channel is set with respect to a second section when a section between a BM-SC and a base station is set as a first section and a section between the base station and a first terminal that intends to receive the MBMS broadcasting service is set as the second section.

13. The method for receiving an MBMS broadcasting service of claim 12, further comprising:
    when a second terminal receiving the same MBMS broadcasting service from the base station is provided, controlling the set-up of the transmission channel for the first section by using a bearer through the second terminal and when the second terminal receiving the same MBMS broadcasting service from the base station is not provided, controlling the set-up of the transmission channel for the first section by using the first bearer.

14. The method for receiving an MBMS broadcasting service of claim 12, wherein:
    traffic in the first section includes synchronization information of a packet, and
    in the setting of the transmission channel, the transmission channel is set through the second bearer with respect to the second section by using a second bearer mapping method based on synchronization information of a packet when the selected MBMS broadcasting service is not transmitted through the first bearer.

15. The method for receiving an MBMS broadcasting service of claim 14, further comprising:
    bearer mapping in which the base station performs the second bearer mapping method for each terminal when at least two terminals intend to receive the same MBMS broadcasting service.

16. The method for receiving an MBMS broadcasting service of claim 15, further comprising:
    transmitting the MBMS broadcasting service to each terminal to satisfy both the synchronization information of the packet and the QoS information of the bearer in consideration of the wireless channel states of the terminals by using a scheduler performing scheduling by using the synchronization information of the packet and the QoS information of the bearer, which is included in the base station.

17. The method for receiving an MBMS broadcasting service of claim 11, wherein when the selected broadcasting service is transmitted through both the first bearer and the second bearer, the transmission channel is set through the first bearer with respect to a base layer of an image for the MBMS broadcasting service and through the second bearer with respect to an enhancement layer of the image in the setting of the transmission channel.

18. The method for receiving an MBMS broadcasting service of claim 11, in the setting of the transmission channel, a broadcast bearer is further considered as the first bearer at the time of setting the transmission channel.

* * * * *